June 23, 1931. H. J. BURNISH 1,810,902
ELECTRIC ARC WELDING OF PIPE JOINTS
Filed Nov. 18, 1929

INVENTOR.
Howard J. Burnish
BY
ATTORNEY.

Patented June 23, 1931

1,810,902

UNITED STATES PATENT OFFICE

HOWARD J. BURNISH, OF MILWAUKEE, WISCONSIN, ASSIGNOR TO A. O. SMITH CORPORATION, OF MILWAUKEE, WISCONSIN, A CORPORATION OF NEW YORK

ELECTRIC ARC WELDING OF PIPE JOINTS

Application filed November 18, 1929. Serial No. 407,978.

This invention relates to electric arc welding of pipe joints.

The object of the invention is to provide a welded pipe joint without wasting a portion of the length of the pipe and which will be free from the objections as to projections on the inside of the pipe.

Another object is to provide a novel scarfing of the end edges of the pipe sections whereby the sections may be interlocked in alignment and whereby a welding groove is provided for receiving deposited welding metal.

Other objects will appear hereinafter with reference to the preferred embodiment illustrated in the accompanying drawings in which the views are as follows.

The pipe sections 1 and 2, to be joined, preferably have their ends upset or otherwise formed to provide beads 3 at the outer circumference thereof. Each pipe section has a scarf 4 at the inner circumference of one of its ends and a complementary tongue or projection 5 at the inner circumference of its other end.

Figure 1:
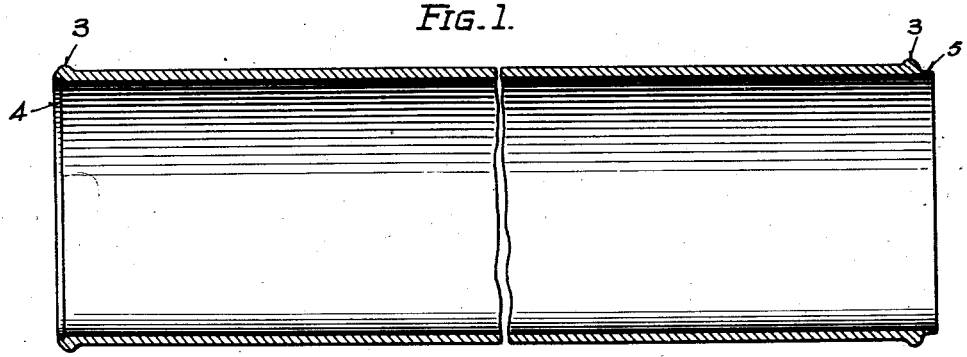
Figure 1 is a longitudinal section of a pipe section.
Figure 2:
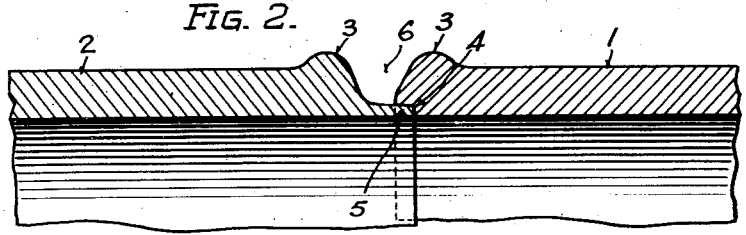
Fig. 2 is an enlarged section showing two pipe sections in position for welding.
Figure 3:
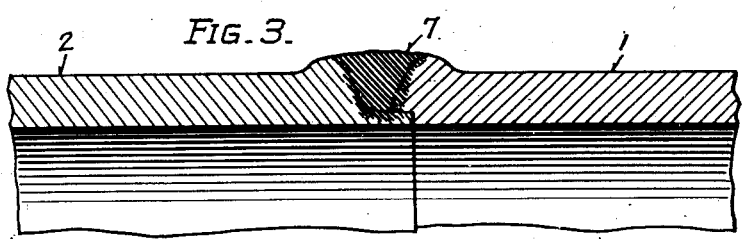
Fig. 3 is a similar section showing the finished weld.

As shown in Fig. 2, the complementary ends of the pipe sections 1 and 2 are abutted with the tongue 5 of the section 2 inserted into the scarf 4 of section 1 to align and interlock the pipe sections preparatory for welding.

The end edges are further shaped to provide a welding groove 6 above the interlocking tongue 5 and scarf 4 and between the respective beads 3. In the shaping of the ends of the pipe sections, it has been found preferable to heat the metal at the ends of the sections locally and then to force the same into die members to give the metal the required shape. However, other means of forming the end edges may be employed.

Figure 4:
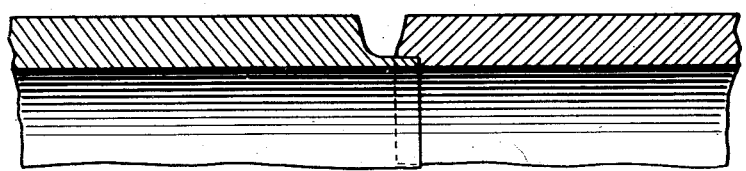
Fig. 4 is a section similar to Fig. 2 showing a modified form of scarf.

The beads 3 are preferably of such thickness as to define a welding groove 6 of approximately the same depth as the thickness of the wall of the pipe sections 1 and 2. However, the beads 3 may be dispensed with entirely as in the modified form of chamfer illustrated in Fig. 4.

In welding the pipe sections together, metal is deposited in the welding groove 6 preferably by means of an electric arc until the groove is substantially filled. The weld 7 thus provided has fused welding metal for a depth substantially equal to the thickness of the pipe walls. The interlocking portion of the pipe ends are also fused together by the arc.

The invention provides a pipe joint which is of maximum strength and which allows utilization of the full length of the pipe sections without waste. Furthermore, the interlocking tongue and scarf prevent the formation of icicles or projections on the inner wall of the joint.

I claim:

1. A pipe joint comprising two sections of pipe having their meeting ends interlocked, raised beads at the outer circumference of said ends to define a welding groove therebetween, and welding metal deposited between said beads and ends and fused with and joining said interlocked ends to form an integral tubular structure.

2. A pipe joint comprising two sections of pipe to be joined end to end, said pipe sections having their meeting ends provided with tongue and groove interlocking portions and raised beads defining a welding groove, and welding metal deposited in the welding groove and fused with the metal of the ends of the pipe sections and said beads to join the same into an integral tubular structure.

3. In electric arc welding, the steps which comprise providing a tongue at the lower edge of one of the parts to be welded, providing a complementary scarf for receiving said tongue in the other edge to be welded, providing a welding groove above the interlocked tongue and scarf of the edges, depositing welding metal in said groove, and fusing the same with the metal of the edges to thereby weld the interlocked edge portions into an integral structure.

4. A pipe joint comprising a pair of pipe sections having their adjacent ends in abutting relation with a welding groove therebetween, a relatively thin projection extending from one of the end edges to the other and closing the groove at the inner surface of the pipe, raised circumferential beads at said end edges providing an additional depth of the welding groove, and weld metal filling said groove and uniting said sections into an integral structure.

5. A welded joint comprising metal parts having their adjacent edges in abutting relation with a welding groove therebetween, a relatively thin projection extending from one of said edges to the other and closing the welding groove at the bottom, raised circumferential beads at the top of said edges providing an additional depth of the welding groove, and weld metal filling said groove and uniting said parts into an integral structure.

In witness whereof I have hereunto signed my name at Milwaukee, Wisconsin, this 15th day of November, 1929.

HOWARD J. BURNISH.